US012603301B2

(12) United States Patent
Febry et al.

(10) Patent No.: US 12,603,301 B2
(45) Date of Patent: Apr. 14, 2026

(54) COMPONENT FOR SOLID OXIDE FUEL CELL

(71) Applicants: JFE STEEL CORPORATION, Tokyo (JP); TreadStone Technologies, Inc., Princeton, NJ (US)

(72) Inventors: Muhammad Febry, Tokyo (JP); Takayoshi Yano, Tokyo (JP); Tetsuyuki Nakamura, Tokyo (JP); Akito Mizutani, Tokyo (JP); Masataka Yoshino, Tokyo (JP); Reiko Sugihara, Tokyo (JP); Conghua Wang, West Windsor, NJ (US)

(73) Assignees: JFE STEEL CORPORATION, Tokyo (JP); TreadStone Technologies, Inc., Princeton, NJ (US)

( * ) Notice: Subject to any disclaimer, the term of this patent is extended or adjusted under 35 U.S.C. 154(b) by 420 days.

(21) Appl. No.: 17/823,608

(22) Filed: Aug. 31, 2022

(65) Prior Publication Data

US 2024/0072266 A1 Feb. 29, 2024

(51) Int. Cl.
*H01M 8/021* (2016.01)
*H01M 8/0217* (2016.01)
(Continued)

(52) U.S. Cl.
CPC ......... *H01M 8/021* (2013.01); *H01M 8/0219* (2013.01); *H01M 8/0245* (2013.01); *H01M 2008/1293* (2013.01)

(58) Field of Classification Search
CPC ......... C22C 38/54; C22C 38/52; C22C 38/50; C22C 38/48; C22C 38/46; C22C 38/44; C22C 38/42; C22C 38/06; C22C 38/02; C22C 38/04; C22C 38/00; C23C 4/08; C23C 4/01; C23C 4/10; C23C 4/18;
(Continued)

(56) References Cited

U.S. PATENT DOCUMENTS

| | | | |
|---|---|---|---|
| 9,765,421 B2 | 9/2017 | Wang | |
| 9,920,409 B2 | 3/2018 | Mizutani et al. | |

(Continued)

FOREIGN PATENT DOCUMENTS

| | | |
|---|---|---|
| CA | 2596198 A1 | 2/2008 |
| DE | 202011106778 U1 | 12/2011 |

(Continued)

OTHER PUBLICATIONS

JP2011162863A translation (Year: 2011).*

(Continued)

*Primary Examiner* — Osei K Amponsah
*Assistant Examiner* — Amanda Rosenbaum
(74) *Attorney, Agent, or Firm* — KENJA IP LAW PC

(57) ABSTRACT

Disclosed is a component for solid oxide fuel cells that is excellent in both electrical conductivity and chromium poisoning resistance. As a substrate, a ferritic stainless steel having a chemical composition containing, in mass %, Cr: 14.0% to 32.0% and Al: 2.50% to 7.00% is used. Precious metal particles are coated on a surface of the substrate. The precious metal particles have: an average particle size of 1 $\mu$m or more and 10 $\mu$m or less; a coating thickness of 0.5 $\mu$m or more and 10 $\mu$m or less; and a surface coverage of 1.0% or more.

2 Claims, 1 Drawing Sheet

50 $\mu$m

(51) Int. Cl.
    *H01M 8/0245*      (2016.01)
    *H01M 8/12*        (2016.01)

(58) Field of Classification Search
    CPC ....... C23C 4/06; H01M 8/021; H01M 8/0219;
                                         H01M 8/0245
    See application file for complete search history.

(56) References Cited

U.S. PATENT DOCUMENTS

| | | | | |
|---|---|---|---|---|
| 10,544,490 | B2 | 1/2020 | Hatano et al. | |
| 10,714,764 | B2 | 7/2020 | Yano et al. | |
| 2009/0176120 | A1 | 7/2009 | Wang | |
| 2013/0330654 | A1 | 12/2013 | Balogh et al. | |
| 2017/0301929 | A1 | 10/2017 | Tarutani | |
| 2017/0321310 | A1* | 11/2017 | Hatano | C21D 1/76 |
| 2017/0356074 | A1* | 12/2017 | Wang | C23C 4/08 |
| 2018/0305797 | A1* | 10/2018 | Nakamura | C22C 38/004 |
| 2024/0072266 | A1 | 2/2024 | Febry et al. | |

FOREIGN PATENT DOCUMENTS

| | | | | |
|---|---|---|---|---|
| DE | 102013209918 | A1 | | 12/2013 |
| JP | 2003187828 | A | | 7/2003 |
| JP | 2008016248 | A | | 1/2008 |
| JP | 2009293106 | A | | 12/2009 |
| JP | 2011162863 | A | * | 8/2011 |
| JP | 2017160494 | A | | 9/2017 |
| JP | 2018080371 | A | | 5/2018 |
| JP | 2021004384 | A | | 1/2021 |
| JP | 2022068645 | A | | 5/2022 |
| WO | 2016052622 | A1 | | 4/2016 |
| WO | 2017056452 | A1 | | 4/2017 |
| WO | 2018008658 | A1 | | 1/2018 |

OTHER PUBLICATIONS

Jul. 11, 2023, International Search Report issued in the International Patent Application No. PCT/JP2023/016173.

Aug. 27, 2025, the Extended European Search Report issued by the European Patent Office in the corresponding European Patent Application No. 23859707.4.

* cited by examiner

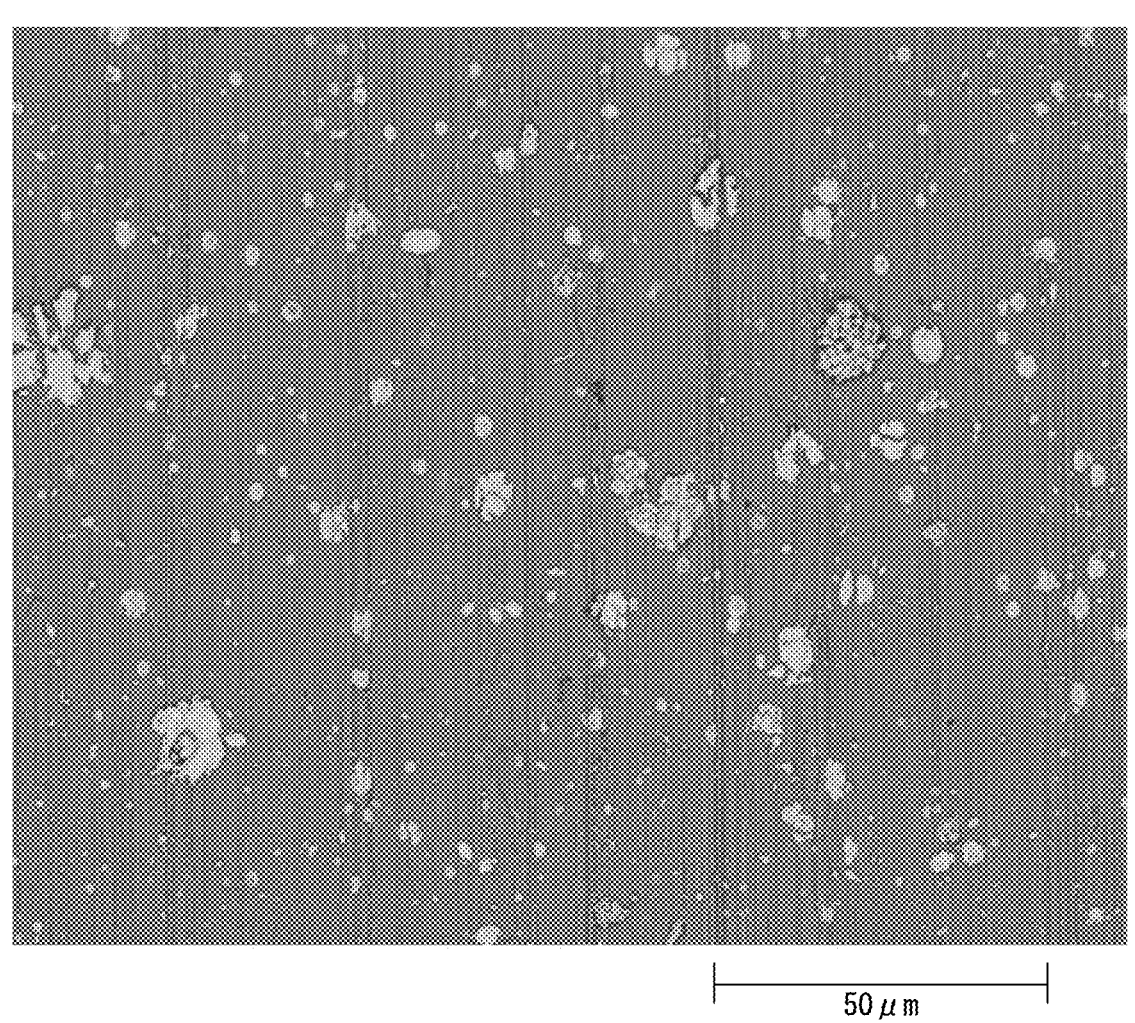
50 μ m

COMPONENT FOR SOLID OXIDE FUEL CELL

TECHNICAL FIELD

This disclosure relates to a component for solid oxide fuel cells that is excellent in both electrical conductivity and chromium poisoning resistance.

BACKGROUND

Fuel cells emit fewer harmful gases and generate electricity more efficiently. Therefore, fuel cells are expected to be applied to a wide range of power generation systems, including large-scale power generation, cogeneration systems, and automotive power sources.

Among these, solid oxide fuel cells (SOFC) have the advantages of operating at high temperatures of 500° C. to 900° C., not requiring a catalyst for the electrode reaction, and being able to use a wide variety of fuel gases. Therefore, solid oxide fuel cells are attracting attention as a next-generation energy source.

Among the components of a solid oxide fuel cell, an interconnector (also called a "separator" or "bipolar plate") serves to form a gas flow path and connects adjacent cells in a fuel cell stack. Interconnectors are also responsible for carrying current. Therefore, interconnectors are required to have electrical conductivity. Various metallic materials have been proposed for use in such interconnectors of solid oxide fuel cells.

For example, JP 2003-187828 A (PTL 1) describes: "a ferritic stainless steel for solid oxide fuel cell components, containing, in mass %, C: 0.03% or less, Mn: 2.0% or less, Ni: 0.6% or less, N: 0.03% or less, Cr: 10.0% to 32.0%, and at least one of 2.0% or less of Si or 6.0% or less of Al: 1.5% or more in total, with the balance consisting essentially of Fe".

WO 2018/008658 A (PTL 2) describes: "a ferritic stainless steel containing, in mass %, C: 0.030% or less, Si: 1.00% or less, Mn: 1.00% or less, P: 0.045% or less, S: 0.0030% or less, Cr: 20.0% to 25.0%, Mo: 0.3% to 2.0%, N: 0.040% or less, Al: 0.50% or less, V: 0.20% or less, and Nb: 0.001% to 0.500% and/or Ti: 0.001% to 0.50%, with the balance being Fe and inevitable impurities".

U.S. Pat. No. 9,765,421 B2 describes: "A method that can be used in electrodes for electrochemical devices and includes disposing a precious metal on a top surface of a corrosion-resistant metal substrate".

CITATION LIST

Patent Literature

[PTL 1] JP 2003-187828 A
[PTL 2] WO 2018/008658 A
[PTL 3] U.S. Pat. No. 9,765,421 B2

SUMMARY

The metallic material described in PTL 1 contains a large amount of Si and/or Al in its chemical composition. However, when Si and Al are contained in large amounts, oxides with low electrical conductivity, such as silica and alumina, form on a surface of the metallic material in the high-temperature environment in which solid oxide fuel cells are used. Therefore, when the metallic material described in PTL 1 is used in the interconnector of a solid oxide fuel cell, the electrical resistance increases and the battery performance degrades.

In addition, the metallic material described in PTL 2 contains a certain amount of Cr in its chemical composition so that an oxide coating mainly composed of $Cr_2O_3$ or other Cr-based oxides is formed on a surface of the metallic material. However, under the high-temperature environment in which solid oxide fuel cells are used, Cr-based oxides volatilize and adhere to the electrodes, causing performance degradation of the electrodes (hereinafter referred to as "Cr poisoning"). In fact, no consideration is given to the suppression of Cr poisoning in PTL 2. Therefore, there is concern about the performance degradation of electrodes due to Cr poisoning when the metallic material described in PTL 2 is used in components for solid oxide fuel cells, especially interconnectors.

Similarly, No consideration is given to the suppression of Cr poisoning in PTL 3. Therefore, there is concern about the performance degradation of electrodes due to Cr poisoning when the metallic material described in PTL 3 is used in components for solid oxide fuel cells, especially interconnectors.

It would thus be helpful to provide a component for solid oxide fuel cells that is excellent in both electrical conductivity and chromium poisoning resistance.

We conducted intensive studies to solve the aforementioned problems.

As a result, we have found that these problems can be solved by the use of:

(1) a ferritic stainless steel as a substrate having a chemical composition with a Cr content controlled in a range of 14.0 mass % to 32.0 mass % and an Al content in a range of 2.50 mass % to 7.00 mass %, in which (2) the substrate has a surface coated with precious metal particles, the precious metal particles having:

an average particle size of 1 μm or more and 10 μm or less;

a coating thickness on the substrate (hereinafter also referred to simply as a "coating thickness") of 0.5 μm or more and 10 μm or less; and a surface coverage on the substrate (hereinafter also referred to simply as a "surface coverage") of 1.0% or more.

The reason for this is considered as follows.

In a ferritic stainless steel having a chemical composition in which a Cr content is 14.0 mass % to 32.0 mass % and an Al content is 2.50 mass % to 7.00 mass %, alumina surface layer forms on a surface of the ferritic stainless steel under the high-temperature environment in which solid oxide fuel cells are used, and the formation of Cr-based oxides is prevented. As a result, volatilization of Cr-based oxides is suppressed and Cr poisoning of electrodes is prevented. However, alumina has low electrical conductivity, and if alumina forms on a surface of the substrate, the desired electrical conductivity cannot be obtained. To overcome this limitation, precious metal particles are deposited and fused with Al containing ferritic stainless steel surface, resulting in electrical current paths through alumina surface layer. Then, by controlling the average particle size and coating thickness of the precious metal particles to the above ranges, a current path is maintained by the continued presence of the precious metal particles protruding in between the alumina formed on the surface of the substrate. If the surface coverage of the precious metal particles is above a certain level, a sufficient current path is ensured and good electrical conductivity is obtained. In view of the above, we believe that by simultaneously satisfying the aforementioned features (1) and (2), it is possible to achieve both excellent electrical conductivity and excellent chromium poisoning resistance.

The present disclosure is based on these discoveries and further studies.

We thus provide the following aspects.

1. A component for solid oxide fuel cells, comprising a substrate and precious metal particles on a surface of the substrate, wherein the substrate is a ferritic stainless steel having a chemical composition containing (consisting of), by mass %, C: 0.025% or less,
Si: 0.05% to 1.00%,
Mn: 0.05% to 1.00%,
P: 0.050% or less,
S: 0.010% or less,
Cr: 14.0% to 32.0%,
Al: 2.50% to 7.00%,
Ni: 0.01% to 1.00%, and
N: 0.025% or less, with the balance being Fe and inevitable impurities, and wherein the precious metal particles have:

an average particle size of 1 μm or more and 10 μm or less;

a coating thickness on the substrate of 0.5 μm or more and 10 μm or less; and a surface coverage on the substrate of 1.0% or more.

2. The component for solid oxide fuel cells according to aspect 1, wherein the precious metal particles contain at least one selected from the group consisting of Au, Ag, Pt, Pd, Rh, Ir, Ru and Os, as well as alloy particles of these elements.

3. The component for solid oxide fuel cells according to aspect 1, wherein the chemical composition of the ferritic stainless steel further contains, in mass %, at least one selected from the group consisting of Mo: 3.00% or less,
Cu: 0.50% or less,
Co: 1.00% or less,
W: 3.00% or less,
Ti: 0.30% or less,
Nb: 1.00% or less,
V: 0.50% or less,
Zr: 0.50% or less,
B: 0.0050% or less,
Ca: 0.0050% or less,
Mg: 0.0100% or less, and
REM: 0.20% or less.

4. The component for solid oxide fuel cells according to aspect 2, wherein the chemical composition of the ferritic stainless steel further contains, in mass %, at least one selected from the group consisting of Mo: 3.00% or less,
Cu: 0.50% or less,
Co: 1.00% or less,
W: 3.00% or less,
Ti: 0.30% or less,
Nb: 1.00% or less,
V: 0.50% or less,
Zr: 0.50% or less,
B: 0.0050% or less,
Ca: 0.0050% or less,
Mg: 0.0100% or less, and
REM: 0.20% or less.

According to the present disclosure, it is possible to obtain a component for solid oxide fuel cells that is excellent in both electrical conductivity and chromium poisoning resistance.

BRIEF DESCRIPTION OF THE DRAWING

The FIGURE illustrates an SEM micrograph of Sample No. A3 according to an example.

DETAILED DESCRIPTION

The following describes some embodiments of the present disclosure.

(1) Substrate

First, a chemical composition of a ferritic stainless steel used as a substrate of a component for solid oxide fuel cells according to one of the embodiments of the present disclosure (hereinafter also referred to as a "substrate ferritic stainless steel"), is described. The % representations below indicating the chemical composition are in mass % unless stated otherwise.

C: 0.025% or less

C has an effect of increasing the high-temperature strength of the steel. To obtain this effect, the C content is preferably 0.001% or more. However, if the C content exceeds 0.025%, the toughness and formability of the steel decrease. Therefore, the C content is 0.025% or less. The C content is preferably 0.010% or less.

Si: 0.05% to 1.00%

Si has an effect of improving the oxidation resistance of the steel. To obtain this effect, the Si content is 0.05% or more. However, if the Si content exceeds 1.00%, silica with low electrical conductivity is formed at the interface between the oxide film formed at high temperatures and the base metal, resulting in a decrease in the electrical conductivity. For this reason, the Si content is 1.00% or less. The Si content is preferably 0.20% or less.

Mn: 0.05% to 1.00%

Mn has an effect of increasing the peel resistance of the oxide coating formed at high temperatures. To obtain this effect, the Mn content is 0.05% or more. However, if the Mn content exceeds 1.00%, the oxide coating may grow abnormally, resulting in a decrease in the oxidation resistance. In addition, thickening of the oxide coating may result in reduced electrical conductivity. Therefore, the Mn content is 1.00% or less. The Mn content is preferably 0.20% or less.

P: 0.050% or less

P is a harmful element that reduces the toughness of the steel. Accordingly, a lower P content is preferable. Therefore, the P content is 0.050% or less. The P content is preferably 0.030% or less. The lower limit of the P content is not particularly limited. However, since excessive dephosphorization leads to increased costs, the P content is preferably 0.010% or more.

S: 0.010% or less

S is a harmful element that adversely affects the formability and oxidation resistance of the steel. Accordingly, a lower S content is preferable. Therefore, the S content is 0.010% or less. The S content is preferably 0.005% or less. The lower limit of the S content is not particularly limited. However, since excessive desulfurization leads to increased costs, the S content is preferably 0.0001% or more.

Cr: 14.0% to 32.0%

Cr is an important element that assists in the formation of alumina on the surface of the substrate ferritic stainless steel. To obtain this effect, the Cr content is 14.0% or more. The Cr content is preferably 18.0% or more. However, if the Cr content exceeds 32.0%, the toughness and formability of the steel decrease. Therefore, the Cr content is 32.0% or less. The Cr content is preferably 22.0% or less.

Al: 2.50% to 7.00%

Al is an important element that forms alumina on a surface of the substrate ferritic stainless steel and inhibits the formation of Cr-based oxides. In other words, Al has an effect of suppressing volatilization of Cr to prevent Cr poisoning of the electrodes. To obtain this effect, the Al content is 2.50% or more. The Al content is preferably 5.00% or more, and more preferably 5.50% or more. On the other hand, if the Al content exceeds 7.00%, the toughness of the steel decreases, making manufacture difficult. Therefore, the Al content is 7.00% or less. The Al content is preferably 6.5% or less.

Ni: 0.01% to 1.00%

Ni has an effect of improving the toughness and oxidation resistance of the steel. To obtain this effect, the Ni content is 0.01% or more. On the other hand, if the Ni content exceeds 1.00%, γ phase is formed at high temperatures and the oxidation resistance is reduced. Therefore, the Ni content is 1.00% or less. The Ni content is preferably less than 0.20%.

N: 0.025% or less

N is an element that reduces the toughness and formability of the steel. Accordingly, a lower N content is preferable. In particular, if the N content exceeds 0.025%, the toughness and formability may be significantly reduced. Therefore, the N content is 0.025% or less. The N content is preferably less than 0.010%. The lower limit of the N content is not particularly limited. However, since excessive denitrogenation leads to increased costs, the N content is preferably 0.001% or more.

Optionally, the chemical composition of the substrate ferritic stainless steel used in the component for solid oxide fuel cells according to one of the embodiments of the present disclosure, may further contain at least one selected from the group consisting of Mo: 3.00% or less,
Cu: 0.50% or less,
Co: 1.00% or less,
W: 3.00% or less,
Ti: 0.30% or less,
Nb: 1.00% or less,
V: 0.50% or less,
Zr: 0.50% or less,
B: 0.0050% or less,
Ca: 0.0050% or less,
Mg: 0.0100% or less, and
REM: 0.20% or less.

Mo: 3.00% or less

Mo has an effect of improving the high-temperature strength and oxidation resistance of the steel. To obtain this effect, the Mo content is preferably 0.01% or more. The Mo content is preferably 1.20% or more. On the other hand, if the Mo content exceeds 3.00%, the steel becomes harder and manufacturability deteriorates. Therefore, when Mo is contained, the Mo content is 3.00% or less. The Mo content is preferably 2.30% or less.

Cu: 0.50% or less

Cu has an effect of increasing the high-temperature strength of the steel by precipitating in the steel. To obtain this effect, the Cu content is preferably 0.01% or more. However, if the Cu content exceeds 0.50%, toughness decreases and manufacturability deteriorates. Therefore, when Cu is contained, the Cu content is 0.50% or less.

Co: 1.00% or less

Co has an effect of improving the toughness of the steel. To obtain this effect, the Co content is preferably 0.01% or more. On the other hand, if the Co content exceeds 1.00%, the formability of the steel decreases. Therefore, when Co is contained, the Co content is 1.00% or less. The Co content is preferably 0.30% or less.

W: 3.00% or less

W has an effect of increasing the high-temperature strength of the steel. To obtain this effect, the W content is preferably 0.01% or more. On the other hand, if the W content exceeds 3.00%, the steel becomes harder, making manufacture difficult. Therefore, when W is contained, the W content is 3.00% or less. The W content is preferably 1.00% or less.

Ti: 0.30% or less

Ti has an effect of improving the formability of the steel. To obtain this effect, the Ti content is preferably 0.01% or more. However, if the Ti content exceeds 0.30%, coarse Ti (C, N) precipitation is caused, resulting in a decrease in the toughness of the steel. The oxidation resistance also decreases. Therefore, when Ti is contained, the Ti content is 0.30% or less. The Ti content is preferably 0.15% or less, and more preferably 0.05% or less.

Nb: 1.00% or less

Nb has an effect of increasing the high-temperature strength of the steel. To obtain this effect, the Nb content is preferably 0.01% or more. However, if the Nb content exceeds 1.00%, the steel becomes harder and manufacturability deteriorates. Therefore, when Nb is contained, the Nb content is 1.00% or less. The Nb content is preferably 0.40% or less.

V: 0.50% or less

V has an effect of improving the formability and oxidation resistance of the steel. To obtain this effect, the V content is preferably 0.01% or more. However, if the V content exceeds 0.50%, coarse V (C and N) precipitation is caused, resulting in a decrease in the toughness of the steel. Therefore, when V is contained, the V content is 0.50% or less. The V content is preferably 0.10% or less.

Zr: 0.50% or less

Zr has an effect of improving oxidation resistance. To obtain this effect, the Zr content is preferably 0.01% or more. However, if the Zr content exceeds 0.50%, Zr intermetallic compounds precipitate and the toughness of the steel decreases. Therefore, when Zr is contained, the Zr content is 0.50% or less. The Zr content is preferably 0.10% or less.

B: 0.0050% or less

B has an effect of improving the toughness of the steel. To obtain this effect, the B content is preferably 0.0002% or more. On the other hand, if the B content exceeds 0.0050%, BN forms and the formability of the steel decreases. Therefore, when B is contained, the B content is 0.0050% or less. The B content is preferably 0.0010% or less.

Ca: 0.0050% or less

Ca has an effect of improving oxidation resistance. To obtain this effect, the Ca content is preferably 0.0002% or more. However, if the Ca content exceeds 0.0050%, the steel is prone to surface defects. Therefore, when Ca is contained, the Ca content is 0.0050% or less. The Ca content is preferably 0.0020% or less.

Mg: 0.0100% or less

Mg has an effect of improving oxidation resistance. To obtain this effect, the Mg content is 0.0002% or more. However, if the Mg content exceeds 0.0100%, the steel is prone to surface defects. Therefore, when Mg is contained, the Mg content is 0.0100% or less. The Mg content is preferably 0.0025% or less.

REM: 0.20% or less.

REM is a generic term for Sc, Y, La, Ce, Pr, Nd, Pm, Sm, and Hf. REM has an effect of improving the adhesion of alumina on a surface of the substrate ferritic stainless steel and improving oxidation resistance. To obtain this effect, the REM content is preferably 0.01% or more, and more preferably 0.06% or more. On the other hand, if the REM content exceeds 0.20%, the steel is prone to surface defects. Therefore, when REM is contained, the REM content is 0.20% or less. The REM content is preferably 0.10% or less.

The balance other than the above is Fe and inevitable impurities.

It is also preferable that the substrate ferritic stainless steel have a microstructure in which a volume fraction of ferrite phase is 95% or more. A volume fraction of the residual microstructures is preferably 5% or less. The residual microstructures include austenite phase and martensite phase. The substrate ferritic stainless steel may have a ferrite single-phase structure (volume fraction: 100%).

In this case, the identification of microstructures (calculation of the volume fraction of ferrite phase) is performed as follows.

A test specimen for cross-sectional observation is taken from the substrate ferritic stainless steel and subjected to etching treatment with a picric acid saturated hydrochloric acid solution. Then, the test specimen for cross-sectional observation is observed under an optical microscopy at 100× magnification for 10 fields of view, and the microstructural shape and the etching strength are analyzed to identify ferrite phase. Then, the volume fraction of the ferrite phase is determined by image processing for each field of view, and the results are averaged. The volume fraction of the ferrite phase is calculated excluding intermetallic compounds, precipitates, and inclusions. The volume fraction of the residual microstructures is calculated by subtracting the volume fraction of the ferrite phase from 100%.

Examples of the component for solid oxide fuel cells according to one of the embodiments of the present disclosure include a blank sheet before being processed into a part shape (such as a plate-like material), in addition to a material processed into a part shape such as an interconnector.

The substrate ferritic stainless steel may be formed into, for example, a plate-like shape (e.g., a steel sheet) or part shape. The thickness of the substrate ferritic stainless steel formed into a plate-like shape (e.g., a steel sheet) or part shape is not particularly limited. However, from the viewpoint of chromium poisoning resistance and formability, the thickness of the substrate ferritic stainless steel is suitably 0.01 mm to 10.0 mm. The thickness of the substrate ferritic stainless steel is preferably 0.03 mm or more. The thickness of the substrate ferritic stainless steel is preferably 8.0 mm or less, and more preferably 2.0 mm or less.

(2) Precious Metal Particles

Next, precious metal particles to be coated on the surface of the substrate ferritic stainless steel will be described.

The precious metal particles are particles of Au, Ag, Pt, Pd, Rh, Ir, Ru and Os, as well as alloy particles of these elements. Among these, preferred are high melting temperature (>1500° C.) precious metals such as Pt, Ir, Rh, Pd, Os and Ru and particularly preferred is Ru. The high melting temperature precious metal will ensure the long term operation stability at the high working temperature of SOFCs. The precious metal particles may be composed of one of the above elements, or two or more of the above elements. In the latter case, for example, the precious metal particles may be a mixture of particles of two or more of the above elements, or particles of an alloy of two or more of the above elements.

The precious metal particles coated on the surface of the substrate ferritic stainless steel are present on the surface in an island-like separated morphology. In this case, each portion exhibiting such island-like morphology is referred to as a "particle". Maintaining island-like morphology of the precious metal coating, instead of the conventional continue layer coating, can a) reduce the usage of precious metal and b) minimize the stress between the coating layer and substrate due to the thermal expansion coefficient mismatch, which is necessary to avoid coating layer delamination for high temperature SOFC applications.

As mentioned above, it is extremely important to simultaneously control the average particle size, coating thickness, and surface coverage of the precious metal particles to be coated on the surface of the substrate ferritic stainless steel to the following ranges, respectively.

Average Particle Size of the Precious Metal Particles: 1 μm or More and 10 μm or Less If the average particle size of the precious metal particles is less than 1 μm, It becomes difficult to reliably bond (or fuse) precious metal particles on substrate ferritic stainless steel. On the other hand, if the average particle size of the precious metal particles exceeds 10 μm, the stress between the precious metal particles and substrate due to thermal expansion coefficient mismatch could lead to delamination of precious metal particles from substrate ferritic stainless steel. When the precious metal particles peel off, the current path is lost and good electrical conductivity cannot be obtained. Therefore, the average particle size of the precious metal particles is 1 μm or more and 10 μm or less.

The average particle size of the precious metal particles is the average of the circular equivalent diameters calculated from the area of each precious metal particle observed on the surface of the substrate. Specifically, the measurement is made by the method described in the EXAMPLES section below. The average particle size of the precious metal particles is calculated excluding those particles with an equivalent circular diameter of less than 0.1 μm, which do not substantially contribute to securing a current path. Similarly, the coating thickness and the surface coverage of the precious metal particles to be described later are calculated excluding those particles with an equivalent circular diameter of less than 0.1 μm.

Coating Thickness of Precious Metal Particles: 0.5 μm or More and 10 μm or Less

If the coating thickness of the precious metal particles is less than 0.5 μm alumina forms thickly on the surface of the substrate ferritic stainless steel and covers the precious metal particles under the high-temperature environment in which solid oxide fuel cells are used. As a result, the current path is lost and good electrical conductivity cannot be obtained. On the other hand, if the coating thickness of the precious metal particles exceeds 10 μm, the precious metal particles tend to peel off from the surface of the substrate ferritic stainless steel. When the precious metal particles peel off, the current path is lost and good electrical conductivity cannot be obtained. Therefore, the coating thickness of the precious metal particles is 0.5 μm or more and 10 μm or less.

The coating thickness of the precious metal particles is the average of the maximum lengths of the precious metal particles in the direction perpendicular to the surface of the substrate (hereinafter also referred to as "the direction perpendicular to the substrate surface"). More specifically, the measurement is made by the method described in the EXAMPLES section below.

Surface Coverage of the Precious Metal Particles: 1.0% or More

When the surface coverage of the precious metal particles is less than 1.0%, the current path is insufficient to provide good electrical conductivity. Therefore, the surface coverage of the precious metal particles is 1.0% or more. The surface coverage of the precious metal particles is preferably 5.0% or more. The upper limit of the surface coverage of the precious metal particles is not particularly limited and may be as high as 95%. However, higher surface coverage of the precious metal particles leads to higher costs. Therefore, the surface coverage of the precious metal particles is preferably less than 80%.

The surface coverage of the precious metal particles is the surface coverage of the precious metal particles on the surface of the substrate, and is determined by:

> [the surface coverage of the precious metal particles (%)]=[the area of a region over which the surface of the substrate is covered by the precious metal particles (mm$^2$)]/[the area of the surface of the substrate (mm$^2$)]×100.

(3) Production Method

Next, an exemplary production method of the component for solid oxide fuel cells according to one of the embodiments of the present disclosure will be described.

First, a substrate ferritic stainless steel to be used as a substrate is prepared. For example, molten steel is prepared by smelting in a melting furnace such as a converter or an electric furnace. Then, the molten steel is subjected to secondary refining by ladle refining or vacuum refining to adjust the chemical composition as described above. Then, the molten steel is made into a semi-finished product (slab) by continuous casting or ingot casting and blooming. Continuous casting is preferred in terms of productivity and quality. Then, the semi-finished product (slab) is subjected to hot rolling to obtain a hot-rolled steel sheet. The hot-rolled steel sheet may be further subjected to additional processes such as hot-rolled sheet annealing and/or acid cleaning. Hereinafter, when simply referring to a hot-rolled steel sheet, it is intended to include not only a steel sheet as hot-rolled (including a steel sheet obtained by subjecting a steel sheet as hot-rolled to acid cleaning and/or other additional processes) but also a so-called hot-rolled and annealed sheet (including a steel sheet obtained by subjecting a steel sheet as hot-rolled to hot-rolled sheet annealing, and a steel sheet obtained by further subjecting the steel sheet after subjection to the hot-rolled sheet annealing to acid cleaning and/or other additional processes). Depending on the application, a hot-rolled steel sheet can be used as-is as a product without subjection to subsequent processes such as cold rolling (hereinafter also referred to as a "hot-rolled product"). For example, in the case of manufacturing a housing of a solid oxide fuel cell, a hot-rolled steel sheet can be used as-is as a substrate.

Then, the hot-rolled steel sheet is subjected to cold rolling to obtain a cold-rolled steel sheet. Then, the cold-rolled steel sheet is subjected to other subsequent processes such as finish annealing (cold-rolled sheet annealing) and acid cleaning to make a product such as a cold-rolled and annealed sheet (hereinafter also referred to as a "cold-rolled product"). Examples of the cold-rolled and annealed sheet include a steel sheet obtained by subjecting a steel sheet as cold-rolled to final annealing (cold-rolled sheet annealing), and a steel sheet obtained by further subjecting the steel sheet after subjection to the final annealing (cold-rolled sheet annealing) to acid cleaning and/or other additional processes. The atmosphere for cold-rolled sheet annealing is not particularly restricted. For example, bright annealing (BA) may be performed in a reducing atmosphere such as hydrogen, in which case acid cleaning may be omitted. Prior to the acid cleaning, descaling may be performed by shot blasting or mechanical descaling.

The substrate ferritic stainless steel can be prepared as described above.

The above processes may be performed under the conditions in accordance with conventional methods.

For example, when a semi-finished product (slab) is heated before subjection to hot rolling, it is suitably heated to a temperature of 1050° C. to 1250° C.

The hot-rolled sheet annealing is preferably performed in a temperature range of 800° C. to 1150° C. by continuous annealing. The cold rolling may be performed once or twice or more with intermediate annealing in between. From the viewpoint of productivity and required quality, it is preferable that the cold rolling be performed twice or more with intermediate annealing in between. The cold rolling is performed at a total rolling reduction ratio of preferably 50% or more, and more preferably 60% or more.

The final annealing (cold-rolled sheet annealing) is preferably performed in a temperature range of 850° C. to 1100° C. by continuous annealing. A more preferable temperature range is 900° C. to 1050° C.

Furthermore, depending on the application, the final annealing may be followed by skin pass rolling or other processes to adjust the shape, roughness on the sheet surface, and material properties of the steel sheet.

Then, the above-described precious metal particles are coated on a surface of the substrate ferritic stainless steel thus prepared. As a coating method, for example, the thermal spray method is applicable. The thermal spray material may be a precious metal element salt solution or a metal particle suspension. Such material can be heated by flame, plasma, or electric arc, and sprayed using gas to apply coating.

After the coating, heat treatment may be performed at a heat treatment temperature of 100° C. to 500° C. and a heat treatment time of 1 second to 10 hours to improve the adhesion between the precious metal particles and the substrate ferritic stainless steel.

Optionally, the substrate ferritic stainless steel, before or after the coating, may be subjected to further processing such as cutting, bending, bulging, drawing, or otherwise, and formed into the desired shape, e.g., the shape of an interconnector, by shape forming. The coating may be performed before the shape forming, after the shape forming, or both.

EXAMPLES

Steel samples with the chemical compositions listed in Table 1 (with the balance being Fe and inevitable impurities) were prepared by smelting in a vacuum melting furnace and cast into steel ingots of 30 kg in weight. Each steel ingot was heated to 1250° C. and then formed into a sheet bar of 30 mm thick by hot rolling. After being heated to 1150° C., the sheet bar was hot rolled to obtain a hot-rolled steel sheet. The hot-rolled steel sheet was subjected to hot-rolled sheet annealing at temperatures of 850° C. to 1100° C., and then ground to obtain a hot-rolled and annealed sheet with a thickness of 4.0 mm. Then, the hot-rolled and annealed sheet was cold rolled to obtain a cold-rolled steel sheet. Then, the cold-rolled steel sheet was subjected to final annealing at temperatures of 850° C. to 1100° C. to obtain a cold-rolled and annealed sheet with a thickness of 1.0 mm. Then, the front and back surfaces of the cold-rolled and annealed sheet were polished with #800 emery paper and degreased with acetone. From each cold-rolled and annealed sheet, a test specimen was taken for cross-sectional optical microscopy, etched with a picric acid saturated hydrochloric acid solution, and observed under an optical microscopy at 100× magnification to identify the microstructures of the cold-rolled and annealed sheet. The results confirmed that each sample had a ferrite single-phase structure (the volume fraction of ferrite phase: 100%).

The resulting cold-rolled and annealed sheets were coated with ruthenium metal particles using the flame spray method, and Sample Nos. A1 to A5 and Nos. B2 to B3 listed in Table 2 were prepared. For comparison, Sample Nos. B1 and B4 in Table 2 were prepared as cold-rolled and annealed sheets without coating of precious metal particles.

Then, the average particle size, coating thickness, and surface coverage of the precious metal particles were measured for these samples as described below. The results are listed in Table 2.

Specifically, 10 arbitrary locations on the surface of each sample were observed by scanning electron microscopy (hereinafter also referred to as "SEM") at 1000× magnification. Then, in the micrographs taken by SEM (hereinafter referred to as "SEM micrographs"), the precious metal particles coated on the surface of the substrate were identified by image interpretation and the area of each precious metal particle was measured. Then, the equivalent diameters calculated from the areas of the precious metal particles were determined. Then, the average of the results was used as the average particle size of the precious metal particles. For reference, an SEM micrograph of Sample No. A3 is presented in the FIGURE.

The total area of the precious metal particles in the SEM micrographs was defined as the area of a region over which the surface of the substrate is covered by the precious metal particles (mm$^2$). Then, the total area of the precious metal particles in each SEM micrograph was divided by the total area of the observation region in the SEM micrograph, and the result was used as a surface coverage of the precious metal particles.

The coating thickness of the precious metal particles was measured by milling the precious metal particles and the substrate in the direction perpendicular to the substrate surface using a focused ion beam system (hereinafter referred to as "FIB") with Ga ions to prepare a sample for cross-sectional observation of the precious metal particles, and observing the cross-section (observed surface) with SEM at 10000× magnification. Specifically, a test specimen was taken from each sample for cross-sectional observation so that any five precious metal particles are included in the observed objects, and the observation plane was micrographed by SEM to determine the maximum length of each of the five precious metal particles in the direction perpendicular to the substrate surface. In this case, the maximum length corresponds to the distance between the upper and lower edges of a precious metal particle on the observation plane in the direction perpendicular to the substrate surface. The lower edge corresponds to one of the edges of the precious metal particle on the side closer to the substrate surface in the direction perpendicular to the substrate surface, and the upper edge to the other edge on the opposite side. Then, the average of the maximum lengths was used as the coating thickness of the precious metal particles.

These samples were also evaluated for chromium poisoning resistance and electrical conductivity as described below. The results are listed in Table 2.

<Evaluation of Electrical Conductivity>

Each sample was cut to the size of 1.0 mm×20 mm×20 mm and subjected to oxidation treatment in air at 700° C. for 2000 hours. A 5 mm×5 mm Pt paste was applied to the front and back surfaces of each sample after subjection to the oxidation treatment. Then, each sample was held at 700° C. for 30 min to dry. Then, Pt mesh (10 mm×10 mm) was placed on the Pt paste-applied region on each of the front and back surfaces of each sample. The Pt mesh was prepared by joining Pt wires for current application and Pt wires for voltage measurement by point-welding. Then, each sample was held for 30 minutes in a heating furnace heated to 700° C. with a load of 0.1 kgf/cm$^2$ applied. During this holding at 700° C., a current was applied to each sample so that the current density was 0.5 A/cm$^2$ and the voltage at that point was measured to determine the electrical resistance (contact resistivity). Then, the electrical resistance value was measured for each sample with n=3 (i.e., three times), the results were averaged, and the electrical conductivity was evaluated based on the following criteria:

Good: average of electrical resistance is 0.1 Ω·cm$^2$ or less, and

Poor: average of electrical resistance exceeds 0.1 Ω·cm$^2$.

<Chromium Poisoning Resistance>

Each sample was cut to the size of 1.0 mm×20 mm×20 mm and loaded into a quartz sample holder in a quartz tube furnace. The sample holder was placed in the center of the tube furnace. A quartz wool was placed downstream of the sample holder to collect the Cr evaporating from the sample. Then, the temperature in the tube furnace was kept at 700° C. for 100 hours while 15 vol. % H$_2$O$^+$ air flowed through the tube furnace. After the holding, all of the Cr adhering to the sample holder and the quartz wool was dissolved in an acid solution, and the Cr concentration in the acid solution was measured using an inductively coupled plasma mass spectrometer (ICP-MS). Then, the amount of Cr contained in the acid solution was calculated from the Cr concentration and the amount of acid solution. Then, the amount of Cr evaporated from each sample was calculated by dividing the amount of Cr in the acid solution by the surface area of the sample. Then, the chromium poisoning resistance was evaluated based on the following criteria:

Good: the amount of Cr evaporation is 1.0 mg/cm$^2$ or less, and

Poor: the amount of Cr evaporation exceeds 1.0 mg/cm$^2$.

TABLE 1

| Steel | Chemical composition of substrate ferritic stainless steel (mass %) | | | | | | | | | | |
|---|---|---|---|---|---|---|---|---|---|---|---|
| ID | C | Si | Mn | P | S | Cr | Al | Ni | N | Others | Remarks |
| A | 0.005 | 0.11 | 0.12 | 0.026 | 0.001 | 20.2 | 5.45 | 0.16 | 0.009 | | Conforming steel |
| B | 0.005 | 0.12 | 0.08 | 0.019 | 0.002 | 20.0 | 5.81 | 0.12 | 0.006 | La: 0.08, Zr: 0.04 | Conforming steel |
| C | 0.008 | 0.18 | 0.13 | 0.026 | 0.001 | 21.6 | 4.11 | 0.13 | 0.008 | Mo: 1.95, W: 0.68, Ti: 0.05, Nb: 0.34 | Conforming steel |

TABLE 1-continued

| Steel | Chemical composition of substrate ferritic stainless steel (mass %) | | | | | | | | | | |
|---|---|---|---|---|---|---|---|---|---|---|---|
| ID | C | Si | Mn | P | S | Cr | Al | Ni | N | Others | Remarks |
| D | 0.012 | 0.12 | 0.14 | 0.027 | 0.003 | 18.2 | 2.88 | 0.12 | 0.008 | Cu: 0.14, Co: 0.11, V: 0.06, Ca: 0.0005, Mg: 0.0004, B: 0.0003 | Conforming steel |
| E | 0.005 | 0.14 | 0.15 | 0.022 | 0.001 | 20.1 | 0.41 | 0.14 | 0.007 | | Comparative steel |
| F | 0.010 | 0.12 | 0.45 | 0.015 | 0.001 | 21.9 | 0.04 | 0.01 | 0.006 | La: 0.11, Ti: 0.07 | Comparative steel |

TABLE 2

| | | Ruthenium particles | | | Evaluation results | | |
|---|---|---|---|---|---|---|---|
| No. | Steel ID | Average particle size (μm) | Coating thickness (μm) | Surface coverage (%) | Electrical conductivity | Resistance to Cr poisoning | Remarks |
| A1 | A | 5.3 | 4.3 | 5.0 | Good | Good | Example |
| A2 | A | 7.7 | 3.3 | 1.3 | Good | Good | Example |
| A3 | B | 5.5 | 6.8 | 6.5 | Good | Good | Example |
| A4 | C | 9.4 | 5.2 | 4.1 | Good | Good | Example |
| A1 | D | 6.3 | 5.3 | 4.9 | Good | Good | Example |
| B1 | A | — | — | — | Poor | Good | Comparative example |
| B2 | A | 4.8 | 5.2 | 0.8 | Poor | Good | Comparative example |
| B3 | E | 5.4 | 5.8 | 4.5 | Good | Poor | Comparative example |
| B4 | F | — | — | — | Good | Poor | Comparative example |

As can be seen from Table 2, all of the examples exhibited excellent electrical conductivity and excellent chromium poisoning resistance.

In contrast, in one of the comparative examples, No. B1, the surface of the substrate was not coated with precious metal particles, and sufficient electrical conductivity could not be obtained.

In No. B2, the surface coverage of the precious metal particles was below the appropriate range, and sufficient electrical conductivity could not be obtained.

In No. B3, the Al content of the substrate ferritic stainless steel was below the appropriate range, and sufficient chromium poisoning resistance could not be obtained.

In No. B4, the Al content of the substrate ferritic stainless steel was below the appropriate range, and sufficient chromium poisoning resistance could not be obtained.

The foregoing examples are provided merely for the purpose of explanation and are in no way to be construed as limiting. While reference to various embodiments is made, the words used herein are words of description and illustration, rather than words of limitation. Further, although reference to particular means, materials, and embodiments are shown, there is no limitation to the particulars disclosed herein. Rather, the embodiments extend to all functionally equivalent structures, methods, and uses, such as are within the scope of the appended claims.

INDUSTRIAL APPLICABILITY

The component for solid oxide fuel cells according to the present disclosure is particularly suitable for use as an interconnector. The component for solid oxide fuel cells according to the present disclosure is also suitable for use as a component for other fuel cells such as solid oxide electrolyzer cells (also called SOEC) or solid oxide reversible cells (also called SORC).

The invention claimed is:

1. A component for solid oxide fuel cells, comprising a substrate and precious metal particles on a surface of the substrate, wherein the substrate is a ferritic stainless steel having a chemical composition consisting of, by mass %, C: 0.025% or less, Si: 0.05% to 1.00%, Mn: 0.05% to 1.00%, P: 0.050% or less, S: 0.010% or less, Cr: 14.0% to 32.0%, Al: 2.50% to 7.00%, Ni: 0.01% to 1.00%, N: 0.025% or less, and optionally at least one selected from the group consisting of:

Mo: 3.00% or less,

Cu: 0.50% or less,

W: 3.00% or less,

Ti: 0.15% or less,

Nb: 1.00% or less,

V: 0.50% or less,

Zr: 0.50% or less,

B: 0.0050% or less,

Ca: 0.0050% or less,

Mg: 0.0100% or less, and

REM: 0.20% or less, wherein REM is Sc, Y, La, Ce, Pr, Nd, Pm, Sm, and Hf, with the balance being Fe and inevitable impurities, and wherein the precious metal particles have:

an average particle size of 5.3 μm or more and 10 μm or less;

a coating thickness on the substrate of 0.5 μm or more and 10 μm or less; and a surface coverage on the substrate of 1.0% or more.

2. The component for solid oxide fuel cells according to claim 1, wherein the precious metal particles contain at least one selected from the group consisting of Au, Ag, Pt, Pd, Rh, Ir, Ru and Os, as well as alloy particles of these elements.

\* \* \* \* \*